(12) United States Patent
Kobielski et al.

(10) Patent No.: US 10,619,670 B1
(45) Date of Patent: Apr. 14, 2020

(54) THRUST BEARING ASSEMBLY

(71) Applicant: GE Global Sourcing LLC, Norwalk, CT (US)

(72) Inventors: Louis Kobielski, Sherman, NY (US); Baris Uygun, Erie, PA (US); Adam C. Felton, Grove City, PA (US)

(73) Assignee: transportation ip holdings, llc, Norwalk, CT (US)

( * ) Notice: Subject to any disclaimer, the term of this patent is extended or adjusted under 35 U.S.C. 154(b) by 0 days.

(21) Appl. No.: 16/268,589

(22) Filed: Feb. 6, 2019

(51) Int. Cl.
*F16C 17/06* (2006.01)
*F16C 33/10* (2006.01)
*F16C 17/04* (2006.01)

(52) U.S. Cl.
CPC .......... *F16C 33/1065* (2013.01); *F16C 17/04* (2013.01); *F16C 2360/23* (2013.01)

(58) Field of Classification Search
CPC .... F16C 17/06; F16C 17/065; F16C 32/0666; F16C 32/067; F16C 33/108; F16C 37/002
See application file for complete search history.

(56) References Cited

U.S. PATENT DOCUMENTS

| 5,503,479 | A | * | 4/1996 | Ide | F01D 25/166 384/122 |
| 5,513,917 | A | * | 5/1996 | Ide | F01D 25/164 384/100 |
| 9,169,866 | B2 | * | 10/2015 | Sato | F16C 17/03 |
| 9,874,247 | B2 | * | 1/2018 | Wang | F16C 32/0655 |

FOREIGN PATENT DOCUMENTS

JP    2002206522 A  *  7/2002  .......... F16C 33/1045

* cited by examiner

*Primary Examiner* — Phillip A Johnson
(74) *Attorney, Agent, or Firm* — The Small Patent Law Group LLC; Mary D. Lawlor (57) ABSTRACT

A thrust bearing assembly includes a body comprising a first outer surface and a second outer surface, and a pocket extending between an open end at the first outer surface and a closed end disposed within the body between the first outer surface and the second outer surface. The assembly includes a pad comprising a base end and a free end. The base end is coupled to the closed end of the pocket and the free end is disposed proximate the first outer surface of the body. The body and the pad are configured to be formed as a unitary component. The assembly also includes a cooling channel extending within the body and the pad. The cooling channel is configured to fluidly couple the body with the pad. The cooling channel directs cooling fluid to one or more positions within the body and one or more positions within the pad.

20 Claims, 3 Drawing Sheets

THRUST BEARING ASSEMBLY

FIELD

Embodiments of the present disclosure generally relate to bearing assemblies, including thrust bearing assemblies.

BACKGROUND

Bearing assemblies, such as thrust bearings, are used in rotary applications and permit rotation between parts and support predominantly axial loads. Turbines used for the generation of electric power include a thrust bearing to protect against axial motion of the turbine rotor assembly. The thrust bearing may be provided at a position intermediate the low-pressure and high-pressure stages of a turbine. The axial position of the turbine rotor shaft is an important variable in the operation of the power plant since a variation of only a few hundreds of an inch in a device that is tens of feet long can result in damage to seals.

Known tilting pad thrust bearings are formed of multiple pieces, including a ring carrier, a round socket joint, and a pad that sits on top of the socket joint to reduce wear damage to the ring carrier caused by the axial forces by the turbine rotor shaft. The individual pieces may be formed by casting and/or machining blocks of metal that are joined together. Joints between the multiple components are subject to the axial loads of the turbine. Additionally, the multiple components are joined together at rigid joints that may be subject to increased risk of fracture.

Furthermore, as the designs of turbines improve, turbine assemblies are capable of operating at higher loads, thereby increasing the operating temperature of the turbine assemblies. Cooling passages formed within the thrust bearings are limited by the machining capabilities of the thrust bearing components. As the manufacturing complexity of the thrust bearing increases, so does the cost of the thrust bearing.

BRIEF DESCRIPTION

In one embodiment, a thrust bearing assembly includes a body comprising a first outer surface and a second outer surface, and a pocket extending between an open end at the first outer surface and a closed end disposed within the body between the first outer surface and the second outer surface. The assembly includes a pad comprising a base end and a free end. The base end is coupled to the closed end of the pocket and the free end is disposed proximate the first outer surface of the body. The body and the pad are configured to be formed as a unitary component. The assembly also includes a cooling channel extending within the body and the pad. The cooling channel is configured to fluidly couple the body with the pad. The cooling channel directs cooling fluid to one or more positions within the body and one or more positions within the pad.

In one embodiment, a thrust bearing assembly includes a body comprising a first outer surface and a second outer surface. The body extending about a center axis of the thrust bearing assembly. The body includes a pocket extending between an open end at the first outer surface and a closed end disposed a distance away from the first outer surface within the body. The assembly includes a pad comprising a base end and a free end. The base end is coupled to the closed end of the pocket and the free end is disposed proximate the first outer surface of the body. The free end of the pad includes a free end surface area and the base end of the pad includes a base end surface area. The free end surface area is greater than the base end surface area. The body and the pad are configured to be formed as a unitary component. A cooling channel extends within the body and the pad. The cooling channel fluidly couples the body with the pad. The cooling channel directs cooling fluid to one or more positions within the body and one or more positions within the pad.

In one embodiment, a thrust bearing assembly includes a body comprising a first outer surface and a second outer surface. The body extends about a center axis of the thrust bearing assembly. The body includes plural pockets. Each pocket extends between an open end at the first outer surface and a closed end disposed a distance away from the first outer surface within the body. The assembly includes plural pads comprising base ends and free ends. The base end of each pad is coupled to the closed end of one of the pockets and the free end of each pad is disposed proximate the first outer surface of the body. The free ends of the plural pads include a free end surface area and the base ends of the plural pads include a base end surface area. The free end surface area is greater than the base end surface area. Each pad is configured to move relative to the body and independent of each other pad. The body and the plural pads are configured to be formed as a unitary component. A cooling system including one or more cooling passages extends within the body and each pad. The cooling system fluidly couples the body with each of the plural pads. The one or more cooling passages direct cooling fluid to one or more positions within the body and one or more positions within each pad between the base end and the free end of each pad.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein relates to thrust bearing assemblies that are at least partially additively manufactured. The additively manufactured thrust bearing assemblies are formed as a unitary or single piece component including a body, plural pads that are coupled with the body, and cooling channels extending within the body and each of the plural pads. The body includes plural pockets having closed ends and open ends. A base end of each pad is coupled with the closed end of each pocket allowing each of the pads to dynamically move, bend, flex, pivot, or tilt responsive to varying axial or thrust forces onto each pad and independent of the movement of each other pad. The additively manufactured thrust bearing assemblies may also be formed of a common or different metal or metal alloys. The cooling channel directs cooling fluid to one or more different positions within the body and within each of the pads. Controlling the flow of cooling fluid (e.g., cooling oil, or the like) within the body and the pads enables the turbine to operate at increased loads while substantially maintaining the temperature of the turbine assembly relative to thrust bearing assemblies that are formed of multiple pieces and cannot include cooling channels or cooling passages within the pads and the body. Additionally, the cooling channels may have varying shapes and/or sizes within each of the pads, or may include protrusions to increase the turbulence of the flow of the cooling fluid relative to the absence of protrusions.

Figure 1:
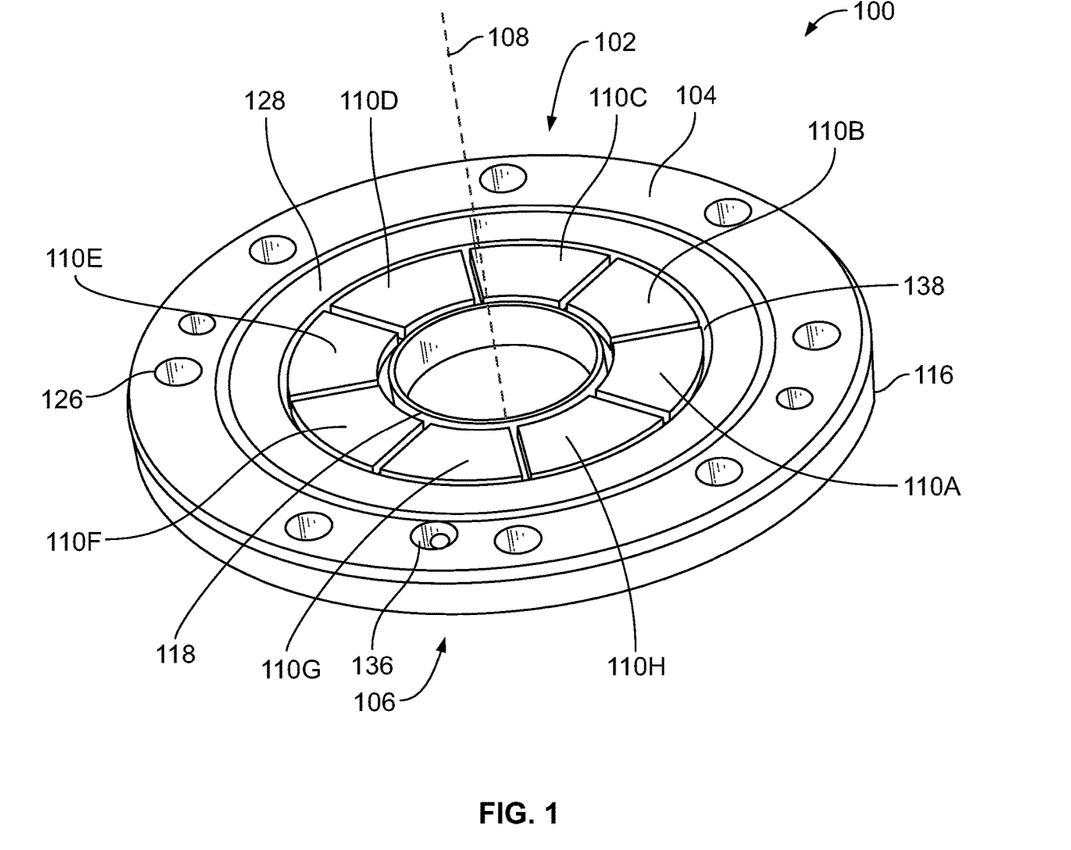
FIG. 1 illustrates one embodiment of a thrust bearing system.
Figure 2:
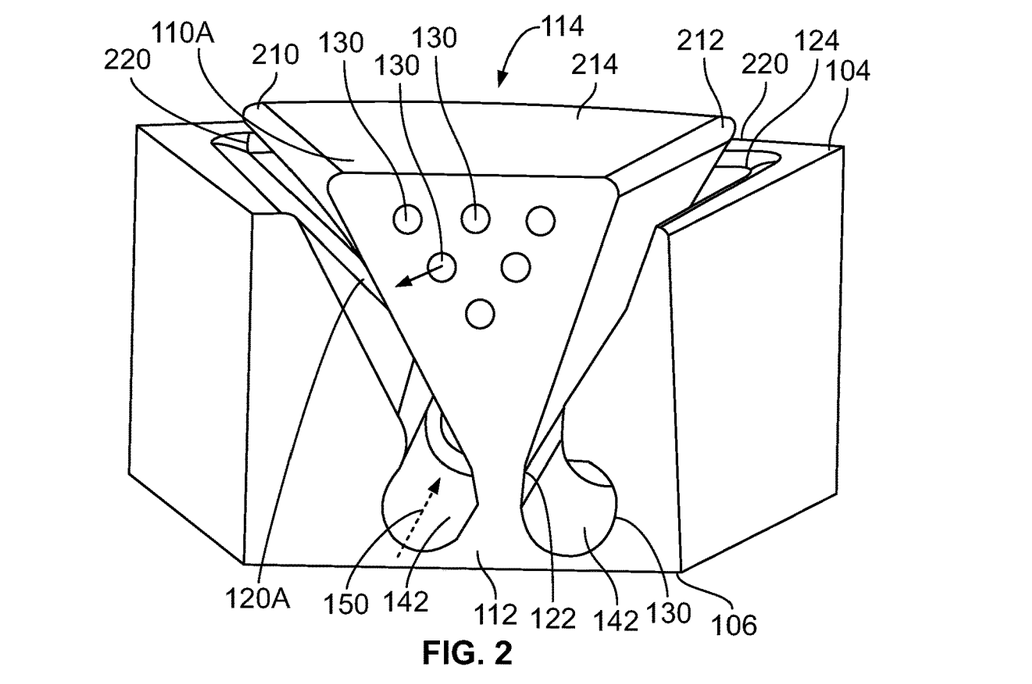
FIG. 2 illustrates a partial cross-sectional view of the thrust bearing system shown in FIG. 1 in accordance with one embodiment.

FIG. 1 illustrates one embodiment of a thrust bearing assembly 100. FIG. 2 illustrates a partial cross-sectional view of the thrust bearing assembly 100. The thrust bearing assembly 100 may be disposed within an engine system or propulsion system, such as a turbocharger, having one or more rotating components. In one embodiment, an engine system for a locomotive or other rail vehicle includes a turbocharger having one or more thrust bearing assemblies as described herein. The engine system (not shown) may be used in one or more applications, such as automotive, marine, aerospace, or the like.

The assembly 100 includes a body 102 having a first outer surface 104 and an opposite second outer surface 106 with a side wall surface 116 extending therebetween the first and second outer surfaces 104, 106. In one or more embodiments, the first outer surface 104 may also be referred to as a top or thrust bearing surface. For example, the top surface or the thrust bearing surface of the body 102 receives a thrust force or an axial force on the top surface when the engine system is operating. In the illustrated embodiment, the body 102 has a substantially circular shape about a center axis 108 of the body 102. Additionally, the first and second outer surfaces 104, 106 have substantially planar surfaces. Optionally, the body 102 may have any alternative three-dimensional shape and/or size.

The body 102 includes a bore or passage 118 that extends between the first and second outer surfaces 104, 106 and is centered and elongated along the center axis 108. For example, the passage 118 may receive a shaft of the engine or propulsion system of which the thrust bearing assembly 100 is used. The shaft (not shown) may rotate the body 102 of the thrust bearing assembly 100 in a direction of rotation about the center axis 108.

The body 102 includes a cooling fluid feeder opening 136 that is disposed on the first outer surface 104. The cooling fluid feeder opening 136 is a passage that is open at the first outer surface 104 and directs cooling fluid 150 (e.g., such as oil or an alternative cooling fluid) to the first outer surface 104 to cool or reduce a temperature of the first outer surface 104, to provide lubrication to the first outer surface 104, or the like. The cooling fluid feeder opening 136 may have any shape, size, or orientation, or the like to direct cooling fluid 150 out of the body 102 and onto the first outer surface 104. Optionally, the body 102 may include any number of cooling fluid feeder openings 136 disposed at different positions about the center axis 108.

The body 102 also includes plural passages 126 that are disposed at different positions about the center axis 108 and extend between the first and second outer surfaces of the body 102. In one embodiment, the passages 126 may be used to mount the thrust bearing assembly 100 to one or more components or surfaces of the engine system (not shown).

In the illustrated embodiment, the first outer surface 104 also includes a first recess 128 that extends about the center axis 108. For example, the first recess 128 and the body 102 of the assembly 100 are concentric about the center axis 108. The first outer surface 104 also includes a second recess 138 that is concentric with the first recess 128. The first recess 128 includes a step away from the first outer surface 104 and the second recess 138 includes a step down or away from the first recess 128. Optionally, the first outer surface 104 may have an incline between the passage 118 and the side wall surface 116 of the body 102 or the first outer surface 104 may include any number of unique or common steps of reduction between the side wall surface 116 and the passage 118.

The body 102 also includes plural pockets 120 each extending between an open end 124 at the first outer surface 104 and a closed end 122 disposed at a position within the body 102 between the first outer surface 104 and the second outer surface 106. Each of the pockets 120 has a common pyramidal shape such that a cross-sectional area of the pocket proximate the closed end 122 is less than a cross-sectional area of the pocket proximate the open end 124. For example, the pockets 120 decrease in volume from the first outer surface 104 toward the second outer surface 106. In the illustrated embodiment, the body 102 includes eight (8) pockets 120A-H that are substantially uniformly disposed radially about the center axis 108. Optionally, one or more of the pockets 120 may have any alternative unique shape and/or size relative to one or more other pockets 120.

The thrust bearing assembly 100 includes plural pads 110A-H that are disposed radially about the center axis 108. In the illustrated embodiment, the assembly 100 includes eight (8) pads 110A-H that correspond to the eight pockets 120A-H. Each pad 110 is disposed within one of the pockets 120 of the body 102. As shown in FIG. 2, each pad 110 includes a base end 112 and a free end 114. The base end 112 is coupled to the closed end 122 of the pocket 120 and the free end 114 is disposed proximate the first outer surface 104 of the body 102. Each pad 110 also includes an outer surface 214 at the free end 114. The outer surface 214 engages with a mating component (not shown) as the thrust bearing assembly 100 rotates about the center axis 108. In the illustrated embodiment, the free end 114 of each pad 110 extends a distance beyond the second recess 138 such that the outer surface 214 of the pad 110 is substantially planar with the first recess 128. Optionally, the free end 114 of one or more pads 110 may extend any distance between the base end 112 and the free end 114.

The pads 110 are shaped and sized to be disposed within the pockets 120 of the body 102. In the illustrated embodiment, the pockets 120 have an increasing substantially pyramidal shape between the closed end 122 and the open end 124 of each pocket 120 and the pads 110 have a corresponding increasing substantially pyramidal shape between the base end 112 and the free end 114. For example, the base end 112 of each pad 110 has a base end surface area and the free end 114 of each pad has a free end surface area that is greater than the base end surface area. The volume of the pad 110 decreases from the free end 114 to the base end 112. In the illustrated embodiment, each pad 110 has a shape that is like a wedge of cheese of a cheese wheel or a pie slice. For example, the pad 110 has a surface area proximate the center axis 108 that is less than a surface area of the pad 110 proximate the side wall surface 116 of the body 102. Optionally, the pads 110 and/or the pockets 120 may have any alternative quadrilateral shape and/or size. Additionally, the pads 110 fill an amount of the volume of the pockets 120 that is less than the volume of the pockets 120. For example, each pad 110 has a shape that is substantially common with the shape of the pocket, but the size or volume of the pad 110 is less than the size or volume of the pocket 120. The pad 110 having a size that is less than a size or volume of the pocket 120 provides room for the pad 110 to move inside the pocket 120.

The base end 112 of each pad 110 is coupled with the closed end 122 of each pocket 120 but the free end 114 of each pad 110 is not coupled with the open end 124 of each pocket 120. For example, the pad 110 is allowed to move, bend, flex, pivot, tilt, or the like, relative to the body 102 and relative to the pocket 120. Each of the pads 110 is able to dynamically move (e.g., bend, flex, pivot, tilt, or the like) as the body 102 of the thrust bearing assembly 100 rotates about the center axis 108. For example, each of the pads 110 may move dynamically based on varying forces or loads each of the pads 110 may be subject to as the rotating system operates. In one or more embodiments, the pads 110 may also be referred to as springs or spring components, such that the pads 110 are configured to move in a spring motion based on the different loads or forces directed onto the outer surface 214. Optionally, the pad 110 may include one or more components (e.g., extension arms, connecting rods, connecting beams, or the like) that extend between an outer surface of the pad 110 to a surface of the pocket 120 at a position within the pocket 120 between the closed end 122 and the open end 124. For example, one or more components may be coupled with the pocket 120 and the pad 110 to control am amount of movement of the pad 110 relative to the body 102. The base end 112 of the pad 110 is shaped and sized to allow the pad 110 to move relative to the body 102. For example, the base end 112 may be sized to reduce a risk of fracture or failure, and may be sized to increase an amount of allowed movement of the pad 110.

The assembly 100 also includes a cooling channel 130 that is integrated with the body 102 and the pads 100. The cooling channel 130 extends within the body 102 and each of the plural pads 110. In the illustrated embodiment of FIG. 2, the cooling channel 130 is shown directing cooling fluid 150 to different positions within the pad 110A. One or more cooling channels 130 or cooling passages may also extend within the body 102 directing the cooling fluid 150 to different positions within the body 102. (not shown) and directing the cooling fluid 150 to each of the plural pads 110A-H. For example, the cooling channel that extends within the body 102 and within the pad 110 distribute the cooling fluid 150 to different positions within the thrust bearing assembly 100. Optionally, the cooling channel 130 or the system of cooling channels 130 fluidly coupled with one or more of each other cooling channel 130 may also be referred to herein as a cooling system that includes plural cooling passages or conduits extending within the body 102 and the pads 110 that distribute the cooling fluid 150 to different positions inside the body 102 and each of the pads 110.

The cooling channel within the body 102 and the cooling channel 130 within each of the pads 110 may be fluidly coupled with each other via cooling fluid inlets 142. Each cooling fluid inlet 142 directs the cooling fluid 150 from a position within the body 102 into the cooling passage or cooling channel 130 within each pad 110. The cooling fluid inlets 142 may have any alternative shape and/or size. Optionally, plural different cooling fluid inlets may direct some of the cooling fluid 150 into each of the pads 110A-H. The cooling fluid 150 may be directed or fed into a galley (not shown) of the body 102 of the thrust bearing assembly 100 from a location outside of the thrust bearing assembly 100. The cooling channels 130 direct the cooling fluid 150 from the galley to different positions within the body 102 and different positions within each of the plural pads 110. The cooling fluid 150 may be a liquid, a gas, or a liquid-gas mixture that is used to reduce the temperature of the thrust bearing assembly 100.

In the illustrated embodiment of FIG. 2, the cooling channel 130 within the pad 110 includes plural conduits or passages. The plural conduits and passages of the cooling channel 130 direct the cooling fluid 150 to different positions within the pad 110 at locations underneath the outer surface 214 of the pad 110. Each of the plural conduits or passages of the cooling channel 130 within the pad 110 may be fluidly coupled with each other such that the cooling channel 130 is a continuous serpentine cooling channel. The continuous serpentine cooling channel 130 directs the cooling fluid 150 in different directions, such as in a direction A that extends in a direction coming out of the page of FIG. 2, and in a direction B that extends in a direction going into the page of FIG. 2. For example, the cooling channel 130 continuously directs the cooling fluid 150 to plural different positions within the pad 110. In one or more embodiments, the continuous serpentine cooling channel 130 may also extend inside the body 102 and inside each of the plural pads 110A-H. For example, cooling passages or conduits disposed within each pad may be fluidly coupled with each other.

In one or more embodiments, the cooling channel 130 extending within the pad 110 may include plural different cooling channels 130 and each cooling channel 130 is fluidly coupled with the cooling fluid inlet 142. For example, each of the plural conduits or passages of the cooling channel 130 may not be fluidly coupled with each other conduit or passage, and the different conduits or passages may direct the cooling fluid 150 to different positions within the pad 110. A first cooling channel (not shown) may direct at least some of the cooling fluid 150 to positions within the pad 110 proximate the base end 112 of the pad 110, and a second cooling channel (not shown) may direct at least some of the cooling fluid 150 to positions within the pad 110 proximate the free end 114 of the pad 110. The continuous serpentine cooling channel or the plural different cooling channels 130 direct the cooling fluid 150 in plural different directions within the pad 110.

In one or more embodiments, the cooling channel 130 (e.g., a continuous serpentine cooling channel 130 or cooling channels 130 having separate conduits) may have a first size at a first position within the pad 110 (e.g., proximate the base end 112) and may have a different second size that is greater or larger than the first size at a second position within the pad 110 (e.g., proximate the free end 114). For example, the first size may have a cross-sectional area that is larger or greater than a cross-sectional area of the second size, such that the cooling channel has a bigger area or size proximate the base end 112 and has a smaller area or size proximate the free end 114. The cross-sectional area of the cooling channel may continually increase between a first position and a second position within the pad, may continually decrease between the first and second positions, or any combination therein.

The size of the cooling channel 130 in one pad 110A may be substantially the same or may be different than a size of the cooling channel 130 in a second pad 110B. Optionally, the cooling channel 130 may have a common shape and size within the pad 110 and within the body 102, or alternatively one or more of the cooling channels may have a different shape and/or size at different positions within the body 102 and the pad 110. For example, the cooling channel 130 may have a substantially circular cross-sectional shape at a first position within the pad 110, and may have a substantially oval, rectangular, or any alternative shape at a second position within the pad 110. The cooling channel 130 may have a size proximate the free end 114 that is greater than a size of the cooling channel 130 proximate the base end 112 to increase the volume of cooling fluid 150 that is directed to toward the free end 114 of the pad 110. In one or more embodiments, the cooling channel 130 within the first pad 110A may have a cross-sectional area that is larger than a cross-sectional area of the cooling channel within the second pad 110B, the cooling channel 130 within the first pad 110A may be longer than the cooling channel 130 within the second pad 110B such that a volume or amount of cooling fluid 150 that flows within the first pad 110A is greater than a volume or amount of cooling fluid 150 that flows within the second pad 110B, or the like, or any combination therein.

In one or more embodiments, the cooling channel 130 may include one or more protrusions, such as fins, disposed inside the cooling channel 130 that interfere with the flow of the cooling fluid 150 within the cooling channel 130. For example, the protrusions or fins may increase a surface area of the interior of the cooling channel 130, may increase a turbulence of the flow of the cooling fluid 150, or the like.

Each pad 110 also includes a leading edge 210 and a trailing edge 212 with the outer surface 214 disposed therebetween. For example, the leading edge 210 may lead the pad 110 in the direction of rotation of the thrust bearing assembly 100 about the center axis 108. In one embodiment, the cooling channel 130 disposed within the pad 110 is fluidly coupled with a leading edge pocket 220 at the open end 124 of the pocket 120. The cooling channel 130 directs at least some of the cooling fluid 150 out of the pad 110 and into the leading edge pocket 220. The cooling fluid 150 is directed from the leading edge pocket 220 onto and across the outer surface 214 of the pad 110 at the free end 114 of the pad 110 in a direction toward the trailing edge 212 of the pad 110. A trailing edge pocket 222 receives the cooling fluid 150 and directs the cooling fluid 150 back into the pad 110 or to a different position within the body 102.

The body 102 and each of the plural pads 110 can be manufactured additively as a single, unitary component with the cooling channel 130 and each of the cooling fluid inlets 142 that extend within the body 102 and each of the pads 110A-H additively manufactured with the body 102 and each of the pads 110A-H. For example, the body 102 and each pad 110 are formed as a unitary body. Additively manufacturing the thrust bearing assembly 100 allows for the thrust bearing assembly 100 to be more compact and include fewer separate and distinct components than non-additively manufactured thrust bearing assemblies, to have varying three-dimensional shapes, to have multi-domain cooling techniques (e.g., cooling channels or passages) within the same unitary component. Additive manufacturing can involve joining or solidifying material under computer control to create a three-dimensional object, such as by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the thrust bearing assembly 100 can be formed in another manner.

In one or more embodiments, the body 102 and the pads 110 may be formed as separate components that may be operably coupled with each other. For example, the body 102 may be formed as a first additively manufactured component including cooling fluid inlets and cooling channels, and each of the pads 110 may be formed as second additively manufactured components including the cooling fluid inlets and the cooling channels 130 disposed therein. For example, each pad 110 may individually be additively manufactured, or all of the pads 110 may be additively manufactured with each other pad as a single unitary component including each pad 110. In or more alternative embodiments, the body 102 and/or the pads 110 may be manufactured via alternative manufacturing methods or non-additively manufacturing methods. The base end 112 of each of the pads 110 may be operably coupled with the closed end 122 of each pocket 120 to fluidly couple the cooling channels of the body 102 with the cooling channels of the pads 110. For example, the pads 110 may be allowed to move, bend, flex, pivot, tilt, or the like, relative to the pocket 120.

In one or more embodiments, the base end 112 of each pad 110 and the closed end 122 of each pocket 120 may have any alternative interface geometry, may include additional joining, coupling, mating, or the like, components and/or materials, or any combination therein. Additively manufacturing the pads 110 with the body 102 as a unitary component enables the pads to move in different ways relative to the pads 110 being coupled or joined with the body 102 after the pads 110 and the body 102 are formed as separate components. For example, the pads 110 additively manufactured with the body 102 as a unitary structure may flex or pivot relative to the body 102, and the pads 110 coupled with the body 102 with additional joining components may be able to rock or pivot relative to the body 102. In one or more embodiments, each of the pads 110 may be additively manufactured as a single, unitary component together with each other pad 110, and the single unitary component of each of the pads 110 may be coupled with the body 102.

In one or more embodiments, the body 102 and the pads 110 may be manufactured of a common metal alloy. Optionally, the additively manufactured thrust bearing assembly 100 may be manufactured with the body 102 manufactured of a first material and each of the pads 110 manufactured using a different, second material, or the same first material having different properties, or the like. For example, the pads 110 may be manufactured of a metal or metal alloy with increased wear-resistance relative to the metal or metal alloy used to manufacture the body 102. Optionally, the closed end 122 of the pocket 120 that is coupled to the base end 112 of the pad 110 may be manufactured of a metal or metal alloy that is more ductile relative to the metal or metal alloy used to manufacture the other portions of the body 102. Optionally, a first portion of the pad 110 (e.g., a portion proximate the base end 112) and a second portion of the pad 110 (e.g., a portion proximate the free end 114) as a unitary body where the first portion of the pad 110 may be manufactured of a first material and the second portion of the pad 110 may be manufactured of a different, second material, may be manufactured of the first material having different properties than the first material, or the like.

Figure 3:
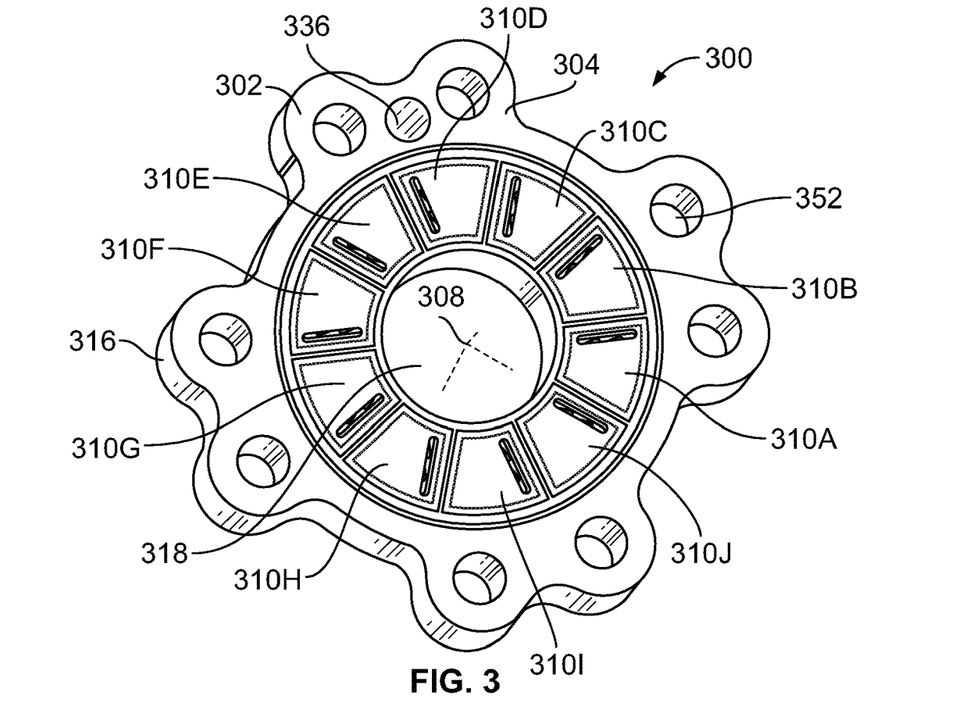
FIG. 3 illustrates one embodiment of a thrust bearing system.
Figure 4:
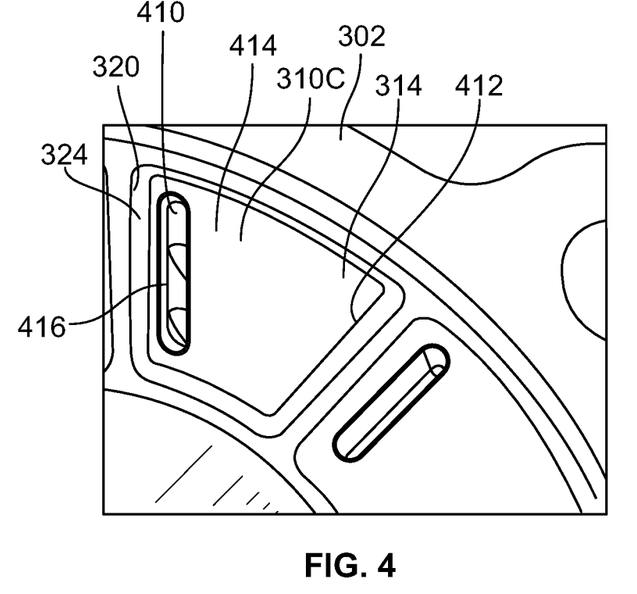
FIG. 4 illustrates a magnified view of the thrust bearing system show in FIG. 3 in accordance with one embodiment.
Figure 5:
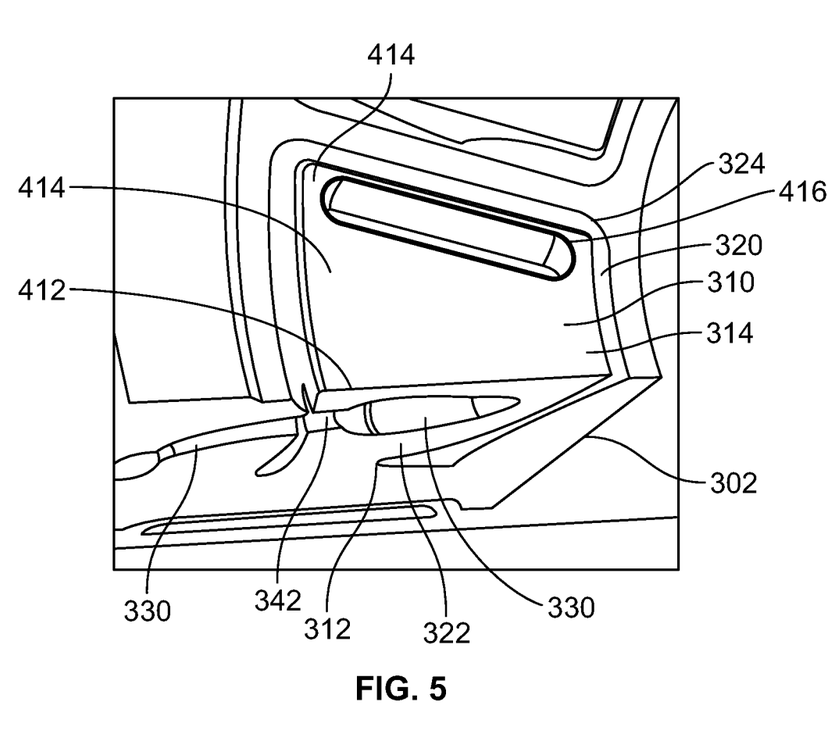
FIG. 5 illustrates a magnified partial cross-sectional view of the thrust bearing system shown in FIG. 3 in accordance with one embodiment.

FIG. 3 illustrates one embodiment of a thrust bearing assembly 300. FIG. 4 illustrates a magnified view of the thrust bearing assembly 300. FIG. 5 illustrates a magnified partial cross-sectional view of the thrust bearing assembly 300. FIGS. 3 through 5 will be discussed together herein.

The thrust bearing assembly 300 is similar to the thrust bearing assembly 100 illustrated in FIGS. 1 and 2, however the thrust bearing assembly 300 has an alternative shape, includes a greater number of pads 310, and has different configurations of cooling channels disposed within a body 302 and each pad 310A-J of the thrust bearing assembly 300. The body 302 includes a first outer surface 304 and a second outer surface (not shown) with a side wall surface 316 extending therebetween. The body 302 also includes plural passages 352 disposed about a center axis 308 and extend between the first and second outer surfaces of the body 302. In one embodiment, the passages 352 may be used to mount the thrust bearing assembly 300 to one or more components or surfaces of the engine system (not shown). The body 302 includes a bore or passage 318 that extends between the first outer surface 304 and the opposite second outer surface and is centered and elongated along the center axis 308. For example, the passage 318 may receive a shaft of the engine or propulsion system of which the thrust bearing assembly 300 is used. The shaft (not shown) may rotate the body 302 of the thrust bearing assembly 300 in a direction of rotation about the center axis 308.

The body 302 includes a cooling fluid feeder opening 336 that is disposed on the first outer surface 304. The cooling fluid feeder opening 336 is a passage that is open at the first outer surface 304 and directs cooling fluid to the first outer surface 304 to cool or reduce a temperature of the first outer surface 304, to provide lubrication to the first outer surface 304, or the like. The cooling fluid feeder opening 336 may have any shape, size, or orientation, or the like to direct cooling fluid out of the body 302 and onto the first outer surface 304. Optionally, the body 302 may include any number of cooling fluid feeder openings 136 disposed at different positions about the center axis 308.

The body 302 includes plural pockets 320 each extending between an open end 324 at the first outer surface 304 and a close end 322 disposed at a position within the body 302 between the first and second outer surfaces. Each pocket 320 has a common shape relative to each other pocket that is substantially pyramidal such that a cross-sectional area of the pocket 320 proximate the closed end 322 is less than a cross-sectional area of the pocket 20 proximate the open end 324. For example, the pockets 320 decrease in volume from the first outer surface 304 in a direction toward the second outer surface.

The assembly 300 includes the plural pads 310A-J that correspond to the plural pockets 320 of the body 302. Each pad 310 includes a base end 312 and a free end 314. The base end 312 is coupled to the closed end 322 of the pocket 320 and the free end 314 is disposed proximate the first outer surface 304 of the body 302. Each pad 310 includes an outer surface 414 at the free end 314 that extends between a leading edge 410 and a trailing edge 412. The outer surface 414 engages with a mating component (not shown) as the thrust bearing assembly 300 rotates about the center axis 308. The pads 310 are sized and shaped to be disposed within the pockets 320. The pads 310 fill an amount of the volume of the pockets 320 that is less than the volume of the pockets 320. For example, each pad 310 has a shape that is substantially common with the shape of the pocket, but the size or volume of the pad 310 is reduced or less than the size or volume of the pocket 320. The size of the pad 310 is based on an amount of movement the pad 310 may be designed to do inside the pocket 320.

Each pad 310 is coupled with each pocket 320 via the base end 312 of each pad 310 is coupled with the closed end 322 of each pocket 320. For example, the pad 310 is allowed to move, bend, flex, pivot, tilt, or the like, relative to the pocket 320 and the body 302. Each of the pads 310 is able to dynamically move (e.g., bend, flex, pivot, tilt, or the like) as the body 302 of the thrust bearing assembly 300 rotates about the center axis 308 based on varying forced directed onto each of the pads 310. The size of the base end 312 of the pad 310 and a surface area of the base end 312 that is coupled with the closed end 322 of the pocket is designed to reduce a risk of fracture or failure of a joint between the base end 312 and the closed end 322, and may be sized to increase an amount of movement that the pad 310 is allowed to make.

The assembly 300 includes a cooling channel 330 that extends within the body 302 and each of the plural pads 310. The cooling channel 330 directs the cooling fluid to different positions within the body 302 and within each of the plural pads 310A-J. The cooling channel 330 within the body 302 is fluidly coupled with the cooling channel 330 within each of the pads 310 via cooling fluid inlets 342. Each cooling fluid inlet 342 directs the cooling fluid from positions within the body 302 into the cooling passage or cooling channel 330 within each pad 310. In one or more embodiments, the cooling channel 130 or the system of cooling channels 130 fluidly coupled with one or more of each other cooling channel 130 may also be referred to herein as a cooling system that includes plural cooling passages or conduits extending within the body 302 and the pads 310 that distribute the cooling fluid to different positions inside the body 302 and each of the pads 310. The cooling fluid may be a liquid, a gas, or a liquid-gas mixture that is used to reduce the temperature of the thrust bearing assembly 300.

Each pad 310 also includes a cooling fluid groove 416 that is disposed proximate the leading edge 410 of each pad 310. In the illustrated embodiment, the cooling fluid grooves 416 are open passages at the outer surface 414 of each pad 310, however in alternative embodiments, the grooves 416 may be positioned on a side-wall surface of one or more of the pads 310. The cooling fluid groove 416 is fluidly coupled with one or more of the cooling channels 330 within the pad 310 such that the cooling channels 330 direct at least some of the cooling fluid from a position inside the pad 310 to the cooling fluid groove 416. The cooling fluid that collects in the cooling fluid groove 416 flows out of the cooling fluid groove 416 and across the outer surface 414 of the pad 310 in a direction from the leading edge 410 toward the trailing edge 412 of the pad 310.

The body 302 and each of the plural pads 310A-J can be manufactured additively as a single, unitary component with the cooling channel 330 and each of the cooling fluid inlets 342 that extend within the body 302 and each of the pads 310A-J additively manufactured with the body 302 and each of the pads 310A-J. The body 302 and the pads 310 may be manufactured of a common metal alloy, or different portions of the body 302 and/or the pads 310 may be manufactured using different metals or metal alloys, using common metal alloys having different properties, or the like.

In one or more embodiments of the subject matter described herein, a thrust bearing assembly includes a body comprising a first outer surface and a second outer surface, and a pocket extending between an open end at the first outer surface and a closed end disposed within the body between the first outer surface and the second outer surface. The assembly includes a pad comprising a base end and a free end. The base end is coupled to the closed end of the pocket and the free end is disposed proximate the first outer surface of the body. The body and the pad are configured to be formed as a unitary component. The assembly also includes a cooling channel extending within the body and the pad. The cooling channel is configured to fluidly couple the body with the pad. The cooling channel directs cooling fluid to one or more positions within the body and one or more positions within the pad.

Optionally, the cooling channel is configured to direct the cooling fluid in plural directions inside the pad.

Optionally, the cooling channel is configured to direct the cooling fluid to one or more positions inside the pad between the base end and the free end.

Optionally, the cooling channel comprises a first size at a first position within the pad and the cooling channel further comprises a different, second size at a different, second position within the pad.

Optionally, the cooling channel comprises a first shape at a first position within the pad, and the cooling channel further comprises a different, second shape at a different, second position within the pad.

Optionally, the pad comprises an outer surface at the free end of the pad fluidly coupled with the cooling channel. The cooling channel is configured to direct the cooling fluid out of the pad and onto the outer surface of the pad.

Optionally, the free end of the pad includes a leading edge and a trailing edge. The cooling channel is configured to direct the cooling fluid out of the pad at the leading edge and in a direction toward the trailing edge across an outer surface at the free end of the pad.

Optionally, the pad is configured to move relative to the body.

Optionally, the body is configured to be manufactured of a first material, and the pad is configured to be manufactured of a different, second material.

Optionally, a first portion of the pad is configured to be manufactured of a first material, and a second portion of the pad is configured to be manufactured of a second material.

Optionally, the first portion of the pad and the second portion of the pad are configured to be formed as a unitary body.

Optionally, the cooling channel is configured to distribute the cooling fluid within the body and the pad.

Optionally, the free end of the pad includes a free end surface area and the base end of the pad includes a base end surface area. The free end surface area is greater than the base end surface area.

Optionally, the pad includes a quadrilateral shape.

Optionally, the body further comprises a cooling fluid inlet fluidly coupled with the cooling channel. The cooling fluid inlet is configured to direct the cooling fluid into the cooling channel.

Optionally, the pad is a first pad and the pocket is a first pocket. The thrust bearing assembly also includes plural pads and plural pockets. The base end of each of the plural pads is coupled to the closed end of each pocket of the body.

Optionally, each of the plural pads is configured to be disposed radially about the center axis.

Optionally, the body and each of the plural pads are configured to be formed as a unitary component.

Optionally, the cooling channel extends within the body and each of the plural pads to direct cooling fluid inside each of the plural pads.

Optionally, the cooling channel is a continuous serpentine cooling channel configured to extend inside the body and inside each of the plural pads.

Optionally, the assembly also includes plural cooling channels. Each cooling channel is configured to direct cooling fluid into and out of each of the plural pads.

Optionally, each cooling channel is fluidly coupled with each other cooling channel.

Optionally, each cooling channel is configured to be additively manufactured within the body and each of the plural pads.

Optionally, the body also comprises a cooling fluid inlet fluidly coupled with each of the cooling channels. The cooling fluid inlet directs the cooling fluid into each of the cooling channels.

In one or more embodiments of the subject matter described herein, a thrust bearing assembly includes a body comprising a first outer surface and a second outer surface. The body extending about a center axis of the thrust bearing assembly. The body includes a pocket extending between an open end at the first outer surface and a closed end disposed a distance away from the first outer surface within the body. The assembly includes a pad comprising a base end and a free end. The base end is coupled to the closed end of the pocket and the free end is disposed proximate the first outer surface of the body. The free end of the pad includes a free end surface area and the base end of the pad includes a base end surface area. The free end surface area is greater than the base end surface area. The body and the pad are configured to be formed as a unitary component. A cooling channel extends within the body and the pad. The cooling channel fluidly couples the body with the pad. The cooling channel directs cooling fluid to one or more positions within the body and one or more positions within the pad.

In one or more embodiments of the subject matter described herein, a thrust bearing assembly includes a body comprising a first outer surface and a second outer surface. The body extends about a center axis of the thrust bearing assembly. The body includes plural pockets. Each pocket extends between an open end at the first outer surface and a closed end disposed a distance away from the first outer surface within the body. The assembly includes plural pads comprising base ends and free ends. The base end of each pad is coupled to the closed end of one of the pockets and the free end of each pad is disposed proximate the first outer surface of the body. The free ends of the plural pads include a free end surface area and the base ends of the plural pads include a base end surface area. The free end surface area is greater than the base end surface area. Each pad is configured to move relative to the body and independent of each other pad. The body and the plural pads are configured to be formed as a unitary component. A cooling system including one or more cooling passages extends within the body and each pad. The cooling system fluidly couples the body with each of the plural pads. The one or more cooling passages direct cooling fluid to one or more positions within the body and one or more positions within each pad between the base end and the free end of each pad.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A thrust bearing assembly comprising:
    a body comprising a first outer surface and a second outer surface, the body comprising a pocket extending between an open end at the first outer surface and a closed end disposed within the body between the first outer surface and the second outer surface;
    a pad comprising a base end and a free end, the base end coupled to the closed end of the pocket and the free end disposed proximate the first outer surface of the body, wherein the body and the pad are configured to be formed as a unitary component; and
    a cooling channel extending within the body and the pad, wherein the cooling channel is configured to fluidly couple the body with the pad, wherein the cooling channel is configured to direct cooling fluid to one or more positions within the body and one or more positions within the pad.

2. The thrust bearing assembly of claim 1, wherein the cooling channel is configured to direct the cooling fluid in plural directions inside the pad.

3. The thrust bearing assembly of claim 1, wherein the cooling channel is configured to direct the cooling fluid to one or more positions inside the pad between the base end and the free end.

4. The thrust bearing assembly of claim 1, wherein the cooling channel comprises a first size at a first position within the pad and the cooling channel further comprises a different, second size at a different, second position within the pad.

5. The thrust bearing assembly of claim 1, wherein the cooling channel comprises a first shape at a first position within the pad, and the cooling channel further comprises a different, second shape at a different, second position within the pad.

6. The thrust bearing assembly of claim 1, where the pad comprises an outer surface at the free end of the pad fluidly coupled with the cooling channel, wherein the cooling channel is configured to direct the cooling fluid out of the pad and onto the outer surface of the pad.

7. The thrust bearing assembly of claim 1, wherein the free end of the pad includes a leading edge and a trailing edge, wherein the cooling channel is configured to direct the cooling fluid out of the pad at the leading edge and in a direction toward the trailing edge across an outer surface at the free end of the pad.

8. The thrust bearing assembly of claim 1, wherein the pad is configured to move relative to the body.

9. The thrust bearing assembly of claim 1, wherein the body is configured to be manufactured of a first material, and wherein the pad is configured to be manufactured of a different, second material.

10. The thrust bearing assembly of claim 1, wherein a first portion of the pad is configured to be manufactured of a first material, and wherein a second portion of the pad is configured to be manufactured of a second material.

11. The thrust bearing assembly of claim 10, wherein the first portion of the pad and the second portion of the pad are configured to be formed as a unitary body.

12. The thrust bearing assembly of claim 1, wherein the free end of the pad includes a free end surface area and the base end of the pad includes a base end surface area, wherein the free end surface area is greater than the base end surface area.

13. The thrust bearing assembly of claim 1, wherein the body further comprising a cooling fluid inlet fluidly coupled with the cooling channel, wherein the cooling fluid inlet is configured to direct the cooling fluid into the cooling channel.

14. The thrust bearing assembly of claim 1, wherein the pad is a first pad and the pocket is a first pocket, the thrust bearing assembly further comprising plural pads and plural pockets, wherein the base end of each of the plural pads is coupled to the closed end of each pocket of the body.

15. The thrust bearing assembly of claim 14, wherein each of the plural pads is configured to be disposed radially about a center axis of the thrust bearing assembly.

16. The thrust bearing assembly of claim 14, wherein the body and each of the plural pads are configured to be formed as a unitary component.

17. The thrust bearing assembly of claim 14, wherein the cooling channel extends within the body and each of the plural pads to direct the cooling fluid inside each of the plural pads.

18. The thrust bearing assembly of claim 14, wherein the cooling channel is a continuous serpentine cooling channel configured to extend inside the body and inside each of the plural pads.

19. A thrust bearing assembly comprising:
a body comprising a first outer surface and a second outer surface, the body configured to extend about a center axis of the thrust bearing assembly, the body comprising a pocket extending between an open end at the first outer surface and a closed end disposed a distance away from the first outer surface within the body;
a pad comprising a base end and a free end, the base end coupled to the closed end of the pocket and the free end disposed proximate the first outer surface of the body, wherein the free end of the pad includes a free end surface area and the base end of the pad includes a base end surface area, wherein the free end surface area is greater than the base end surface area, wherein the body and the pad are configured to be formed as a unitary component; and
a cooling channel extending within the body and the pad, wherein the cooling channel is configured to fluidly couple the body with the pad, wherein the cooling channel is configured to direct cooling fluid to one or more positions within the body and one or more positions within the pad.

20. A thrust bearing assembly comprising:
a body comprising a first outer surface and a second outer surface, the body configured to extend about a center axis of the thrust bearing assembly, the body comprising plural pockets, each pocket extending between an open end at the first outer surface and a closed end disposed a distance away from the first outer surface within the body;
plural pads comprising base ends and free ends, wherein the base end of each pad is coupled to the closed end of one of the pockets and the free end of each pad is disposed proximate the first outer surface of the body, wherein the free ends of the plural pads include a free end surface area and the base ends of the plural pads include a base end surface area, wherein the free end surface area is greater than the base end surface area, wherein each of the plural pads is configured to move relative to the body and independent of each other pad, wherein the body and the plural pads are configured to be formed as a unitary component; and
a cooling system including one or more cooling passages extending within the body and each pad, wherein the cooling system is configured to fluidly couple the body with each of the plural pads, wherein the one or more cooling passages are configured to direct cooling fluid to one or more positions within the body and one or more positions within each pad between the base end and the free end of each pad.

* * * * *